Aug. 15, 1933.  W. H. BIRD  1,922,924
ANTISLIPPING PROJECTION FOR BOOTS AND SHOES
Filed June 15, 1931

W. H. Bird
INVENTOR
By: Marks & Clerk
Attys.

Patented Aug. 15, 1933

1,922,924

UNITED STATES PATENT OFFICE 1,922,924

ANTISLIPPING PROJECTION FOR BOOTS AND SHOES

William Henry Bird, Wanganui, New Zealand

Application June 15, 1931, Serial No. 544,584, and in New Zealand July 1, 1930

2 Claims. (Cl. 36—59)

This invention relates to anti-slipping projections which are secured to the soles of boots and shoes for the purpose of providing a good grip on the ground, particularly in the case of boots for football players and other athletes.

The object of the present invention is to provide these projections of such a nature that they will be simple to attach in position and hard so that great strength and wearing capacity will be given to the projection and consequent improved non-slipping conditions to the boot.

According to the present invention, a stud, having an outwardly flared base portion by which it is attached to the sole of the boot or shoe, is formed of hardened rubber strengthened by a metal reinforcement or reinforcements. This reinforcement extends through the base and into the stud and is incorporated in a body of india rubber or similar material, the whole being moulded to the required shape and vulcanized or otherwise hardened to the necessary density.

The invention will be described with the aid of the accompanying drawing, wherein:—

Figure 1:
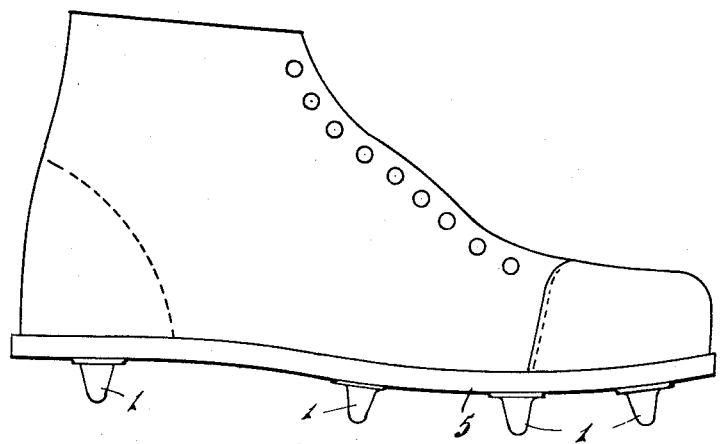
Figure 1 is a view of a boot having the invention applied thereto.

Referring to the drawing, the non-slipping projection comprises a stud 1 having an outwardly flared or extended base 2, the end of the stud being rounded or otherwise shaped, the circular base portion 2 having holes 3 to receive nails 4 (or screws) for attaching the stud to the sole 5 of a boot. The stud is reinforced by a metal disc 6 preferably of aluminium or the like metal, this disc being incorporated in the stud during the manufacture. The disc 6 is dished and has a central opening 7, and the edges round the opening are flared up as shown so as to pass into and reinforce the stud, the remainder of the disc forming most of the base of the stud and this strengthening particularly the stud at the portion to be secured to the boot. The under part of the base is slightly hollowed as at 8 to ensure the edge of the base having a good bearing on the sole.

Figures 2, 4, 6:
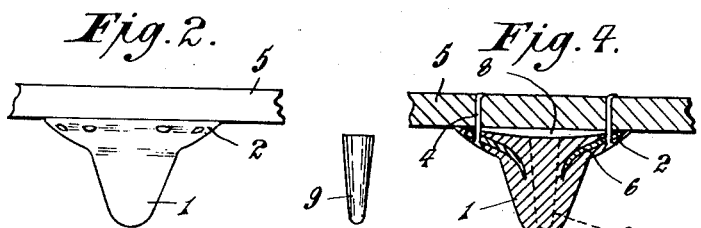
Figure 2 is a side elevation of a stud fixed to the sole.
Figure 4 is a cross section through the stud.
Figure 6 is a view of a reinforcement.

A further reinforcement for the stud may consist in a core 9 passing through the opening 7 of the disc 6 and extending into the stud as far as desired, (see dotted lines Figure 4). Such core may be of rubberized cotton or other suitable material.

The stud itself would be made of vulcanized rubber by first incorporating the disc 6 with the softer rubber and then vulcanizing the whole stud to the required density, thus forming a strongly reinforced hard vulcanized stud which will have no nails forming part of the stud itself. The vulcanizing may be to an extent which will provide a very hard stud or one with considerable elasticity.

Figures 3, 5:
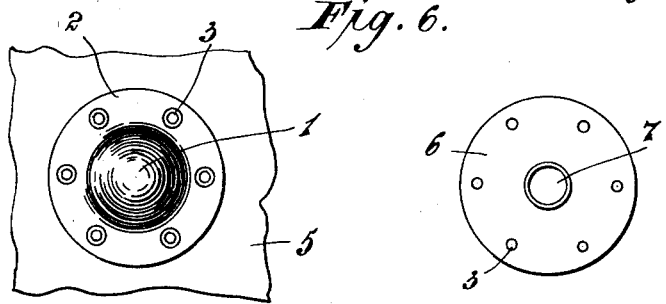
Figure 3 is an inverted plan of the stud.
Figure 5 is a plan of the metal reinforcement.
Figure 7:
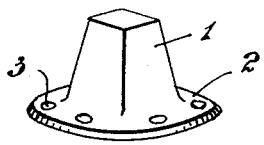
Figure 7 is a perspective view of a stud.

The exterior of the stud may be of desired shape such as conical in Figures 2, 3 and 4, pyramidal as in Figure 7, or other desired shape, the point being rounded, flat or otherwise shaped.

Instead of rubber any other known substance which will give an equivalent result to the vulcanized rubber may be used.

What I claim is:—

1. In anti-slipping projections for boots and shoes, a stud body of hard material having an outwardly extended and slightly hollowed base portion for attachment to the underside of the sole of a boot or shoe, an annular metal reinforcing piece for the base and body, and a reinforcing core passing centrally into the body through the hollowed base portion and metal piece, substantially as described.

2. In anti-slipping projections for boots and shoes, a stud body of vulcanizable rubber having an outwardly extended circular base portion for attachment to the underside of the sole of a boot or shoe, an annular reinforcing metal piece extending throughout the base and having a central opening, the edges of which are flared upwards so as to pass upwardly into the body of the stud, and a further reinforcement consisting of a core of rubberized material passing centrally into the stud, substantially as described.

WILLIAM HENRY BIRD.